United States Patent [19]

Haar

[11] 4,105,236

[45] Aug. 8, 1978

[54] SHOCK ABSORBING BODY

[75] Inventor: Richard Haar, Brunswick, Germany

[73] Assignee: Volkswagenwerk Aktiengesellschaft, Wolfsburg, Germany

[21] Appl. No.: 581,676

[22] Filed: May 28, 1975

[30] Foreign Application Priority Data

Jul. 10, 1974 [DE] Fed. Rep. of Germany ....... 2433137

[51] Int. Cl.² ............................................. B60R 19/08
[52] U.S. Cl. .................................. 293/71 R; 114/219; 267/140
[58] Field of Search ................. 293/71 R, 71 P, 1, 60, 293/70, 87–89, 99; 114/219; 267/139–140; 188/1 C

[56] References Cited

U.S. PATENT DOCUMENTS

| | | | |
|---|---|---|---|
| 2,028,060 | 1/1936 | Gilbert | 293/71 P X |
| 3,606,434 | 9/1971 | Barton et al. | 293/99 X |
| 3,607,497 | 9/1971 | Chrobak | 156/95 |
| 3,779,536 | 12/1973 | Lachman | 267/140 |
| 3,843,182 | 10/1974 | Walls et al. | 267/140 X |
| 3,857,596 | 12/1974 | Nakamura et al. | 267/140 X |
| 3,871,636 | 3/1975 | Boyle | 267/140 |
| 3,884,516 | 5/1975 | Gallion et al. | 293/71 R X |
| 3,895,835 | 7/1975 | Thomson | 267/140 X |
| 3,902,748 | 9/1975 | Bank et al. | 293/71 P |
| 3,926,462 | 12/1975 | Burns et al. | 293/71 R X |

FOREIGN PATENT DOCUMENTS 1,923,305  10/1970  Fed. Rep. of Germany ........ 293/71 R Primary Examiner—Robert B. Reeves
Assistant Examiner—Charles A. Marmor
Attorney, Agent, or Firm—Brumbaugh, Graves, Donohue & Raymond

[57] ABSTRACT

A shock absorbing body for protecting an object, such as an automobile, has an outer wall and end walls, that are attached to a rigid support. The outer wall is deformable on impact, but has a high tensile strength due to a flexible belt imbedded in it. In the area between the outer wall and the rigid support, hollow spaces are formed by pairs of reinforcing walls located throughout the region. The reinforcing walls extend across the region from the outer wall, but do not contact the rigid support. During an impact on the shock absorbing body the outer wall is first deformed until the pairs of reinforcing walls contact the rigid support, thus increasing the strength of the shock absorbing body. If more force is applied, the pairs of reinforcing walls in the area buckle against each other, thereby increasing their strength. Also, the outer wall transmits some of the force through the flexible belt to the other pairs of reinforcing walls, so that the shock is absorbed by a general deformation of the shock absorbing body.

5 Claims, 4 Drawing Figures

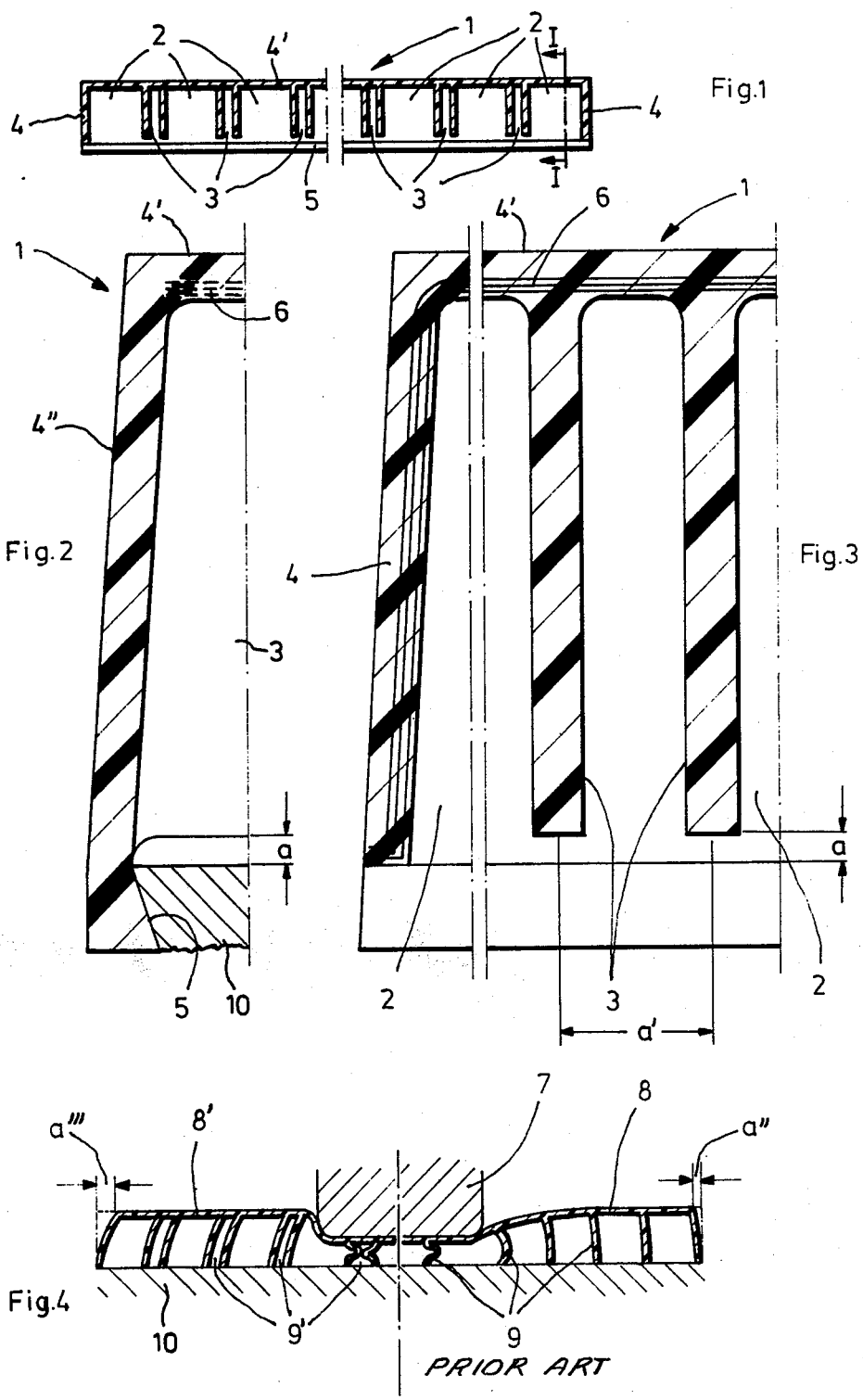

SHOCK ABSORBING BODY

BACKGROUND OF THE INVENTION

This invention relates to shock absorbing bodies and, more particularly, to shock absorbing bumpers for automobiles.

Copending United States patent application Ser. No. 398,818 filed Sept. 19, 1973, and assigned to the assignee of the present invention, describes a shock absorbing body for an object to be protected, such as a shock absorbing bumper for an automobile. This shock absorber has a body with hollow spaces that is arranged on a rigid support means. The outer region of the body is deformable by impact, and is provided with an armor of flexible high tensile strength belts that extend transversely through the outer region. The outer region therefore has a high tensile strength, but it can be bent by impact. Since, the belts extend over the entire outer region, they transmit the thrust forces during a collision to the other material of the deformable body. The advantage of the arrangement shown in the copending application is that during a concentrated localized impact the energy is dissipated, at least to a substantial extent, over the entire body. This is due to the transmission of the thrust forces to the other areas of the body by the arrangement of the deformable body and the high tensile strength belts.

Extensive investigations have shown that an impact can cause a sudden buckling of the walls defining the hollow spaces and extending perpendicularly to the support means in the deformable body. Such a buckling of the walls results in a break in the path of the forces created by the impact. In effect, the thrust would no longer be transmitted to the rest of the body through the belts when these walls have been collapsed.

SUMMARY OF THE INVENTION

The present invention is directed to countering to some extent the localization of impact forces when a collision occurs in a small region of a deformable body by providing the deformable body with pairs of reinforcing walls that extend substantially perpendicular to the support means and are arranged close to each other relative to the width of the hollow spaces formed by these walls.

In an illustrative embodiment of the invention the shock absorbing body has an outer wall and end walls, that are connected to a rigid support surface. The outer wall contains an armor or reinforcement consisting of belts of high tensile strength materials, such as spun-glass. The area between the outer wall and the rigid support is broken up into hollow spaces by pairs of reinforcing walls or ribs that are arranged close to each other relative to the width of the hollow spaces. These ribs extend perpendicularly from the outer wall toward the rigid support. In the event of deformation by a large surface impact, the pairs of ribs prevent the aforementioned sudden buckling of the walls because they mutually brace each other.

When localized impact forces are applied, the regions of the deformable body directly adjacent the impact depression are deformed only slightly in the direction of the impact, i.e. perpendicular to the support means. This is due to the bracing or stiffening effect of the pairs of walls. Since sudden buckling of the ribs does not occur, the amount of deformation transmitted to the rest of the body through the action of the belt becomes larger in the transverse direction of the vehicle than would be the case if individually placed walls were present. As a result, the desired energy absorption by the transmission of thrust forces throughout the body is increased.

If the ribs that define the hollow spaces do not touch the support member under normal conditions, a deformable body is obtained which, in the case of smallimpact forces, is comparatively soft, but which has full resistance to impact when stronger forces cause the ribs to come to bear against the support means.

BRIEF DESCRIPTION OF THE DRAWINGS

The foregoing and other features of the present invention will be more readily apparent from the following detailed description and drawings in which:

FIG. 1 is a top view of a horizontal section of an illustrative embodiment of the present invention;

FIG. 2 is an enlarged end view of a partial cross section of the embodiment along line I—I in FIG. 1;

FIG. 3 is an enlarged view of the left end of the section shown in FIG. 1; and

FIG. 4 shows a comparison during an impact of the invention and an arrangement having single walls.

DESCRIPTION OF AN EXEMPLARY EMBODIMENT

In FIGS. 1-3 there is shown a deformable shock absorbing body (e.g. an automobile bumper) 1 provided with hollow spaces 2 located side by side. This deformable body can be made, for example, from semi-hard polyurethane integral foam. In accordance with the invention the spaces are separated from one another by closely spaced pairs of reinforcing walls or ribs 3 and the outermost chambers or spaces are separated from the outside surroundings by simple end walls 4. A wedge-shaped region 5 which is clearly visible in the end view of FIG. 2, serves to attach the deformable body 1 to a rigid support means 10 (not shown in FIGS. 1 and 3). In an outer wall 4' of the deformable body there is provided an armor or reinforcing belt 6, which consists, for example, of three layers of spun-glass fabric extending over the entire length of the outer wall 4' and over end walls 4. This armor, which has high tensile strength, is intimately joined with the material of the deformable body 1 over its entire length so as to be able to transmit locally produced high stresses that occur during an impact to the other regions of the shock absorber for dissipation. A horizontal wall 4" representing either the top or bottom region of the absorber 1 is also shown in FIG. 2 attached to one of the ribs 3.

In the embodiment shown in the figures, the individual walls of the wall pairs 3 end at a small distance $a$ from the plane of the support means 10 so that they come to bear against the latter only after a given stress has deformed the body 1. Also, the individual walls forming a pair 3 are placed at a distance $a'$ from each other which is small relative to the width of the hollow spaces 2. By way of example, if the hollow spaces 2 have a width of 120 mm, the walls forming a pair 3 may be separated by approximately 20 mm and may end approximately 5 mm before the support means.

FIG. 4 illustrates the effect of an impact by a comparatively small object 7 on the arrangement of the present invention as compared to its effect on a shock absorber with single reinforcing ribs. The deformable body 8 with single walls 9 and armoring belts in its outer wall is shown on the righthand side of the figure. With that arrangement the individual walls 9 buckle comparatively fast in the region of the object 7, i.e. in the vicinity of the impact. This results in only a small deformation $a''$ of the deformable body 8 in the regions removed from the impact. Accordingly, the energy absorption through the transmission of the thrust forces is comparatively small in the body 8.

The situation is different for the deformable body 8' with the pairs of walls 9' shown in the left half of FIG. 4. Inasmuch as the individual walls forming a pair 9' stiffen the arrangement, the walls buckle only in that region of the deformable body 8' situated immediately below the element 7. In the single wall example, two of the single walls 9, including one outside the impact area have buckled; but, only one of the wall pairs 9" of the present invention has buckled. Consequently, the thrust forces in the single wall arrangement go into buckling the rib outside the impact area and are not transmitted along the outer wall by the belt. The stiffening of the body with the pairs of walls occurs not only because of the presence of an additional reinforcing rib, but because the buckled walls brace each other in pairs as shown in FIG. 4. As a consequence of the stiffening, the thrust deformation $a'''$ is considerably larger than in the case of the single wall and the energy absorption through the distribution of the thrust forces is made considerably larger.

While the invention has been particularly shown and described with reference to preferred embodiment thereof, it will be understood by those skilled in the art that various changes in form and details may be made therein without departing from the spirit and scope of the invention.

I claim:

1. A shock absorber for an object to be protected, for example a shock-absorbing automobile bumper, comprising:

an elongated plane rigid support means; and
an elongated deformable body having outer, upper, lower and side walls connected together to form a box-like structure open on one side, said body being attached to said support means and having a hollow region in its interior which is open toward the support means, the outer wall of said body, which faces said support means, being provided with a flexible high tensile strength belt for transmitting shear forces to the material of the deformable body, said deformable body having pairs of walls as part of and extending from its outer wall in a direction substantially perpendicular to said support means, the pairs of walls additionally being attached to said upper and lower walls of the body and dividing the hollow region into first hollow spaces between the pairs of walls and second hollow spaces between the walls of each pair, the walls of each pair of walls being arranged so that the width of the first hollow spaces is greater than the width of the second hollow spaces so that the walls of each pair can brace each other during a collision.

2. A shock absorber as claimed in claim 1, wherein the flexible belt extends beyond the outer wall of said body to end walls of said body located at the ends of the outer wall.

3. A shock absorber for an object to be protected, for example a shock-absorbing automobile bumper, comprising:

an elongated plane rigid support means; and
an elongated deformable body having outer, upper, lower and side walls connected together to form a box-like structure open on one side, said body being attached to said support means and having a hollow region in its interior which is open toward the support means, the outer wall of said body, which faces said support means, being provided with a flexible high tensile strength belt for transmitting shear forces to the material of the deformable body, said deformable body having pairs of walls as part of and extending from its outer wall in a direction substantially perpendicular to said support means, the pairs of walls additionally being attached to said upper and lower walls of the body and dividing the hollow region into first hollow spaces between the pairs of walls and second hollow spaces between the walls of each pair, the walls of each pair of walls being arranged so that they end before reaching said support means, come into contact with said support means during a collision in order to delimit the hollow spaces and have the width of the first hollow spaces greater than the width of the second hollow spaces so that the walls of each pair can brace each other during a collision.

4. A shock absorber for an object to be protected, for example a shock-absorbing automobile bumper, comprising:

an elongated plane rigid support means; and
an elongated deformable body having outer, upper, lower and side walls connected together to form a box-like structure open on one side, said body being attached to said support means by wedge shaped regions at the ends of the upper and lower walls, which wedge shaped regions grip corresponding wedge shaped regions on said support means, said deformable body having a hollow region in its interior which is open toward the support means, the outer wall of said body, which faces said support means, being provided with a flexible high tensile strength belt for transmitting shear forces to the material of the deformable body, said deformable body having pairs of walls as part of and extending from its outer wall in a direction substantially perpendicular to said support means, the pairs of walls additionally being attached to said upper and lower walls of the body and dividing the hollow region into first hollow spaces between the pairs of walls and second hollow spaces between the walls of each pair, the walls of each pair of walls being arranged so that the width of the first hollow spaces is greater than the width of the second hollow spaces so that the walls of each pair can brace each other during a collision.

5. A shock absorber for an object to be protected, for example a shock-absorbing automobile bumper, comprising:

an elongated plane rigid support means; and
an elongated deformable body of semi-hard polyurethane integral foam having outer, upper, lower and side walls connected together to form a box-like structure open on one side, said body being attached to said support means and having a hollow region in its interior which is open toward the support means, the outer wall of said body, which faces said support means, being provided with a flexible high tensile strength belt of spun glass fabric for transmitting shear forces to the material of the deformable body, said deformable body having pairs of walls as part of and extending from its outer wall in a direction substantially perpendicular to said support means, the pairs of walls additionally being attached to said upper and lower walls of the body and dividing the hollow region into first hollow spaces between the pairs of walls and second hollow spaces between the walls of each pair, the walls of each pair of walls being arranged so that the width of the first hollow spaces is greater than the width of the second hollow spaces so that the walls of each pair can brace each other during a collision.

* * * * *